(12) United States Patent
Zhang et al.

(10) Patent No.: US 9,062,584 B2
(45) Date of Patent: Jun. 23, 2015

(54) HYBRID ENGINE AFTERTREATMENT THERMAL MANAGEMENT STRATEGY

(75) Inventors: Yuetao Zhang, Columbus, IN (US); Neal W. Currier, Columbus, IN (US); Mahesh Madurai Kumar, Columbus, IN (US); Morgan M. Andreae, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 220 days.

(21) Appl. No.: 13/340,124

(22) Filed: Dec. 29, 2011

(65) Prior Publication Data

US 2012/0167554 A1 Jul. 5, 2012

Related U.S. Application Data

(60) Provisional application No. 61/428,931, filed on Dec. 31, 2010.

(51) Int. Cl.
*F01N 3/00* (2006.01)
*F01N 3/20* (2006.01)
*F01N 3/035* (2006.01)
(Continued)

(52) U.S. Cl.
CPC ............. *F01N 3/2066* (2013.01); *F01N 3/035* (2013.01); *F01N 3/106* (2013.01); *F01N 3/2026* (2013.01); *F01N 9/00* (2013.01); *F01N 2560/06* (2013.01); *F01N 2560/14* (2013.01); *F01N 2900/104* (2013.01); *F01N 2900/1404* (2013.01); *F01N 2900/1602* (2013.01); *F02N 11/0833* (2013.01); *F02N 2200/026* (2013.01);
(Continued)

(58) Field of Classification Search
CPC ..... F01N 3/035; F01N 13/009; F01N 3/2026;
F01N 3/2066; F01N 9/00; F01N 3/106;
F01N 2560/06; F01N 2900/104; F01N 2900/1404; F01N 2900/1602; F02N 11/0833;
F02N 2200/026; Y02T 10/26; Y02T 10/47;
Y02T 10/24
USPC .................................................... 60/272–324
See application file for complete search history.

(56) References Cited

U.S. PATENT DOCUMENTS 5,801,499 A 9/1998 Tsuzuki et al.
6,018,694 A 1/2000 Egami et al.
(Continued)

OTHER PUBLICATIONS

Notification of Transmittal of the International Search Report and the Written Opinion of the International Searching Authority, or the Declaration, International Application No. PCT/US2011/068140, May 3, 2012, 11 pages.

*Primary Examiner* — Jesse Bogue
(74) *Attorney, Agent, or Firm* — Taft Stettinius & Hollister LLP (57) ABSTRACT

A system includes an internal combustion engine producing exhaust gases as a byproduct of operation and an aftertreatment system that treats the exhaust gases. The system further includes a controller that is structured to functionally execute operations to enhance the temperature of the aftertreatment system. The controller includes an operating condition monitoring module that interprets a temperature value at a position upstream of a catalyst positioned in the aftertreatment system. The controller further includes an operating condition management module that interprets a threshold temperature value, and an engine management module that provides an engine operation command to continue engine operation in response to the temperature value being at least equal to the threshold temperature value.

17 Claims, 3 Drawing Sheets

(51) Int. Cl.
  *F01N 3/10*   (2006.01)
  *F01N 9/00*   (2006.01)
  *F01N 13/00*  (2010.01)
  *F02N 11/08*  (2006.01)

(52) U.S. Cl.
  CPC ............... *Y02T 10/26* (2013.01); *Y02T 10/47* (2013.01); *Y02T 10/24* (2013.01); *F01N 13/009* (2014.06)

(56) References Cited

U.S. PATENT DOCUMENTS

| | | | |
|---|---|---|---|
| 6,532,926 B1 | 3/2003 | Kuroda et al. | |
| 6,729,120 B2* | 5/2004 | Freisinger et al. | 60/274 |
| 6,829,887 B2* | 12/2004 | Suzuki et al. | 60/284 |
| 6,895,744 B2* | 5/2005 | Osawa | 60/277 |
| 7,051,517 B2* | 5/2006 | Mehta et al. | 60/285 |
| 7,059,116 B2* | 6/2006 | Kusada et al. | 60/285 |
| 7,174,252 B1 | 2/2007 | Kolmanovsky et al. | |
| 7,797,938 B2* | 9/2010 | Ruiz | 60/614 |
| 8,386,154 B2* | 2/2013 | Harada | 701/108 |
| 2001/0045090 A1* | 11/2001 | Gray, Jr. | 60/278 |
| 2003/0163243 A1 | 8/2003 | Inoue | |
| 2004/0128982 A1 | 7/2004 | Patchett et al. | |
| 2005/0119822 A1 | 6/2005 | Surnilla et al. | |
| 2005/0262827 A1* | 12/2005 | Ichimoto et al. | 60/277 |
| 2006/0266323 A1 | 11/2006 | Ogimura | |
| 2008/0078166 A1* | 4/2008 | Rose et al. | 60/284 |
| 2008/0307774 A1 | 12/2008 | Gonze et al. | |
| 2009/0151337 A1* | 6/2009 | Tornambe | 60/295 |
| 2009/0193796 A1* | 8/2009 | Wei et al. | 60/297 |
| 2010/0083635 A1* | 4/2010 | Kitaura et al. | 60/276 |
| 2010/0107608 A1 | 5/2010 | Mitsutani | |
| 2011/0023465 A1* | 2/2011 | Asanuma et al. | 60/286 |
| 2012/0079822 A1* | 4/2012 | Yacoub | 60/597 |

\* cited by examiner

FIG. 6

HYBRID ENGINE AFTERTREATMENT THERMAL MANAGEMENT STRATEGY

RELATED APPLICATIONS

This application is related to, and claims the benefit of, U.S. Provisional Patent Application 61/428,931 filed Dec. 31, 2010, which is incorporated herein by reference for all purposes.

BACKGROUND

The present application relates to a system for energy management, and more particularly, but not exclusively, relates to systems for managing energy in an aftertreatment system. Internal combustion engines are commonly used to power vehicles. These engines produce unwanted by-products or emissions as a result of the combustion process, such as $NO_x$. Selective Catalytic Reduction (SCR) systems have been implemented in vehicles with diesel engines to reduce $NO_x$. However, SCR systems generally need to be above a certain temperature to properly reduce emissions. Hybrid power train systems improve the fuel economy of the system, in part, by allowing the engine to shut down during certain operating periods where a torque contribution from the engine is not needed. During an engine shut down, exhaust gases are not flowing through the SCR system, and the SCR system begins to cool toward an ambient temperature. Accordingly, further contributions are needed in this area of technology.

SUMMARY

One embodiment of the present application is directed to a unique thermal management strategy for an aftertreatment system. Other embodiments include unique methods, systems, devices, and apparatus to energy management in aftertreatment system. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
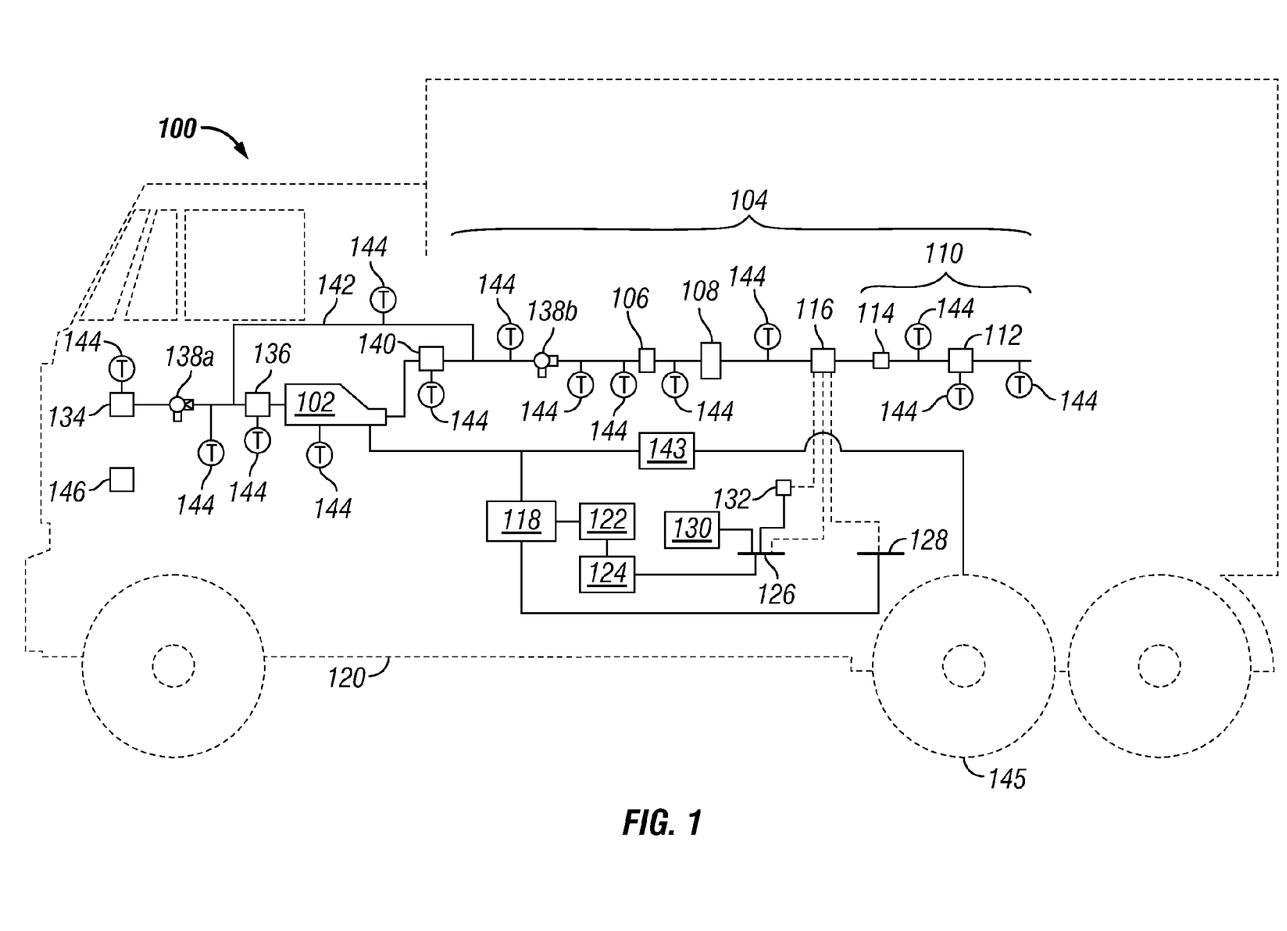
FIG. 1 is a schematic block diagram of a system for a hybrid vehicle.

FIG. 1 shows one embodiment of a system 100. The system 100 may include an internal combustion engine 102 such as a gasoline engine or diesel engine or any other suitable internal combustion engine. The system 100 may include an exhaust system 104 coupled to the engine 102 that receives an exhaust gas stream from the engine 102. The system 100 may include various aftertreatment components to treat constituents of the exhaust gas stream. For example, the system 100 may include an oxidation catalyst 106, a particulate matter filter 108, and/or an selective catalytic reduction (SCR) system 110. The aftertreatment components are presented in an illustrative order, and any arrangement of components is contemplated herein.

The SCR system 110 includes a catalyst 112 and a reductant doser 114. The reductant may be any reductant understood in the art, including urea, ammonia, and/or a hydrocarbon. The catalyst 112 may include one or more catalyst bricks. The exemplary system 100 further includes a heater 116 that heats the exhaust gas stream at a position upstream of the catalyst 112, which thereby accelerates heating of the catalyst 112 as the exhaust gas stream passes through the catalyst 112. The exemplary heater 116 is positioned upstream of the SCR system 110, but the heater 116 may be positioned any place in the exhaust gas stream that is upstream of the catalyst 112, including without limitation at a position downstream of the urea doser 114. The heater 116, in the exemplary system 100, is electrically powered from a DC bus 126 and/or an AC bus 128.

The system 100 further includes an electric machine 118 that is at least selectively operationally coupled to the internal combustion engine 102. The electric machine 118 is configured to propel a vehicle 120 at selectable times, including when the internal combustion engine 102 is stopped. For example, in a hybrid vehicle 120, the engine 102 may be stopped at low speeds or when the vehicle 120 stops to conserve fuel and improve fuel economy. The electric machine 118 will propel the vehicle 120 at low speeds or at take-off, and may continue to provide propulsion to the vehicle 120 at any specified operating condition. The electric machine 118 and the engine 102 may be configured to propel the vehicle in a series, parallel, series-parallel, or any other arrangement.

In certain embodiments, the system 100 does not include a hybrid power train, but the engine may be intermittently stopped, for example when the vehicle 120 is stopped at a red light or stop sign. The electric machine 118 may be any type known by those skilled in the art such as an electric motor, an electric generator, or an electric motor/generator. In addition, the electric machine 118 may be configured to produce an AC voltage or DC voltage. Further, in certain embodiments the electric machine 118 includes more than one motor, generator, and/or motor/generator.

The heater 116 may be an electric heater powered by any suitable energy source including a high-voltage battery 122, a DC-DC converter 124, a DC bus 126, an AC bus 128, a low-voltage battery 130 (e.g., a 12V battery), an inverter 132, or the electric machine 118. The heater 116 may be an AC or a DC device. For example, the electric machine 118 may generate power that is stored in the high-voltage battery 122. A DC-DC converter 124 may be connected to the electric machine 118 and/or battery to convert the voltage to an appropriate voltage for powering the heater 116. The DC-DC converter 124 may supply the converted power to the DC bus 126. The heater 116 may be connected to the DC bus 126 to receive power. In another embodiment, the electric machine 118 may power the heater 116 by supplying an AC voltage to the heater 116 or to an AC bus 128. The system 100 may also have a low-voltage battery 130 (e.g. 12 V, 24 V, or 42 V) connected to the DC bus 126. In yet another embodiment, one or more of the DC voltages may be connected to an inverter 132 to invert the DC voltage into an appropriate AC voltage. The AC voltage may then be supplied to the heater 116 directly or through the AC bus 128.

The system 100 may also include an intake air box 134 (e.g. including an air filter), an intake manifold 136, a turbocharger 138a, 138b, an exhaust manifold 140, and an exhaust gas recirculation (EGR) system 142. As known by those skilled in the art, the turbocharger has a turbine side 138b and a compressor side 138a. The turbocharger is separated schematically in FIG. 1 with reference numerals 138a and 138b to show connections to various components in the system 100.

The system 100 may also include a transmission 143 connected to the engine 102 and/or electric machine 118 to drive a load 145. The transmission 143 is a power splitter, in an exemplary embodiment, that receives mechanical power from the engine 102 and/or the electric machine 118, that provides mechanical power to a load 145 (e.g. the wheels or rear axle of a vehicle 120). The transmission 143 likewise transfers power from the engine 102 to the electric machine 118, and/or from the load 145 to the engine 102 or electric machine 118. The hybrid power train illustrated in FIG. 1 is shown as a parallel hybrid power train, but the arrangement of the power train may be, without limitation, a series power train, a series-parallel power train, or other arrangement understood in the art.

The system 100 may also include one or more temperature sensors 144 positioned at various locations. The sensor(s) 144 may be a physical sensor measuring temperature directly, or a virtual sensor that is a temperature calculated from other measured parameters available in the system 100. The sensors may be positioned to monitor, for example, an intake air temperature, an intake manifold temperature, a turbine inlet temperature, a turbine outlet temperature, a compressor outlet temperature, an engine coolant temperature, an engine oil temperature, an exhaust manifold temperature, an exhaust gas recirculation temperature, an inlet oxidation catalyst temperature, an outlet oxidation catalyst temperature, and/or an outlet particulate matter filter temperature. A given embodiment of the system 100 may include any one or more of the illustrated sensors 144, or may include sensors 144 not shown.

The selection of sensors 144 for providing temperature information upstream of the catalyst 112 is a mechanical step for one of skill in the art having the benefit of the disclosures herein. The temperature of any of the components, such as the oxidation catalyst 106 and the particulate matter filter 108, may be determined by monitoring a sensor 144 located at the inlet, outlet, or inside the component, or any combination thereof such as averaging (standard or weighted average) the inlet, outlet, or internal temperatures. Any one of these sensor locations (i.e., inlet, outlet, inside) may be used alone or in combination to represent the temperature of the component.

The temperature of the catalyst 112 may be measured at the inlet, outlet, or mid-bed of the catalyst 112. In one embodiment, measuring temperature mid-bed may be done by placing a sensor between two catalyst bricks or by providing a sensor within a single catalyst brick as understood in the art.

In certain embodiments, the system 100 may further include a controller 146 structured to perform certain operations to manage aftertreatment temperatures. In certain embodiments, the controller forms a portion of a processing subsystem including one or more computing devices having memory, processing, and communication hardware. The controller 146 may be a single device or a distributed device, and the functions of the controller may be performed by hardware or software.

Figure 2:
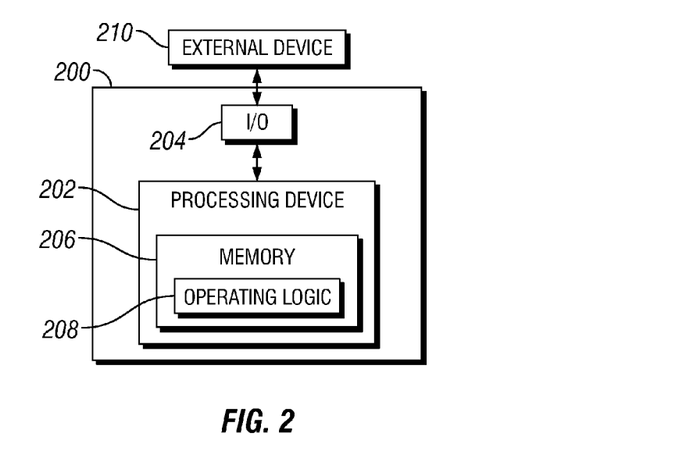
FIG. 2 is a schematic block diagram of a controller.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIGS. 3 and 4. FIG. 2 is a schematic diagram of a controller 200. The controller 200 may be the controller 146 shown in FIG. 1. Controller 200 includes a processing device 202, an input/output device 204, memory 206, and operating logic 208. Furthermore, controller 200 communicates with one or more sensors 144.

The input/output device 204 may be any type of device that allows the controller 200 to communicate with an external device 210 such as sensor 144. The input/output device 204 may receive or interpret information, data, values, or signals regarding operation conditions by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value. Furthermore, the input/output device 204 may receive signals from sensors regarding operating conditions. The input/output device 204 may be comprised of hardware, software, and/or firmware, and a controller 200 may include a number of input/output devices 204.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a mixture of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208.

Figure 3:
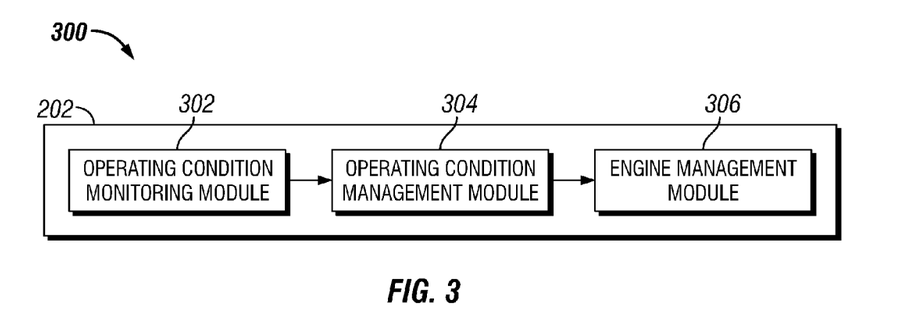
FIG. 3 is a schematic block diagram of a first exemplary processing subsystem.

FIG. 3 is a schematic block diagram of a processing subsystem 300 for managing energy in an aftertreatment system. The processing subsystem 300 includes a processing device 202 that may be part of a controller 200. The processing device 202 includes modules configured to provide multiple functionalities relating to analyzing and managing energy as well as providing other functionalities. The exemplary embodiments described herein may include a number of modules providing a number of functionalities. A module may be implemented as operations by software, hardware, artificial intelligence, fuzzy logic, or any combination thereof, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or in part with other modules or devices. The operations of any module may be performed wholly or partially in hardware/software or by other modules. The presented organization of the modules is exemplary only, and other organizations, configurations and arrangements are contemplated.

The processing subsystem 300 may include an operating condition monitoring module 302 that is structured to monitor an operating condition at a position upstream of the catalyst 112. The operating condition may be a temperature of a component in the system 100, the temperature of the exhaust at a certain point of the system 100, or the temperature of the engine coolant or engine oil.

In certain embodiments, the operating condition is a condition that indicates whether, or can be used to determine whether, the engine is in a state where post-injection events, cylinder shut-off operations, or other operations that increase an exhaust temperature of the engine are available. Exemplary operating conditions include a determination that a torque target of the engine is achievable, that an engine speed target is achievable, that a noise threshold is not exceeded, that a fuel economy target for the engine is not exceeded, and/or that an engine emissions threshold is not exceeded if the engine operations that increase an exhaust temperature of the engine are executed.

In certain embodiments, the operating condition is a condition that indicates or can be used to determine whether sufficient stored power, or power flux capacity, is available to operate a heater or other device to provide heat to the exhaust stream. For example, the operating condition may be a state-of-charge (SOC) of a battery indicating sufficient power stored, a capacity to provide current from an AC-bus or DC-bus to a heater, or other description of electronic power capability understood in the art.

The processing subsystem 300 may also include an operating condition management module 304 that is structured to determine if the operating condition is substantially at or above a threshold value. For example, the operating condition management module 304 may determine whether a temperature reading by sensor 144 is above the current catalyst temperature or operational temperature of the catalyst 112. The current catalyst temperature is the temperature of the catalyst 112 at the time of the determination, and can include the inlet temperature, outlet temperature, mid-bed temperature, estimated substrate temperature, and/or the estimated temperature at the catalyst surface.

The operational temperature of the catalyst 112 is the temperature at which the considered operational feature of the catalyst is sufficiently effective. The operational temperature varies with the catalyst size and composition, the substrate and pore structure, the reactions occurring on the catalyst, and any precursor reactions or activities that occur prior to the reaction on the catalyst. For example, an exemplary catalyst operational temperature is a temperature at which sufficient $NO_x$ conversion occurs in the presence of ammonia, a temperature at which sufficient oxidation of unburned hydrocarbons occurs, a temperature at which ammonia is converted to inert products at a sufficient rate, and/or a temperature at which injected urea sufficiently decomposes and does not crystallize on the catalyst surface. One of skill in the art contemplating a specific catalyst formulation and the reaction being performed on the catalyst can select a catalyst operational temperature having the information that is ordinarily known from a catalyst manufacturer or provider and the benefit of the disclosures herein.

An exemplary operational temperature includes a temperature between 165° C.-230° C. for an SCR catalyst. In certain embodiments, the operational temperature is approximately 200° C. or at least 200° C. Upon a cold-start of the engine, the catalyst temperature generally is below its operational temperature.

In one embodiment, the threshold value is the current temperature of the catalyst. In another embodiment, the threshold value is an operational temperature the catalyst. It is contemplated that the threshold value may be set below or above these values. For example, the threshold value may be set to a higher temperature such that catalyst is operating at its most efficient temperature, or above a temperature that puts the catalyst into a selectable efficiency regime.

In one embodiment, the operating condition is the temperature of an oxidation catalyst 106. In this embodiment, when the temperature of the oxidation catalyst 106 is substantially at or above the threshold value (e.g., current catalyst temperature or operational temperature of the catalyst), the engine 102 continues to run or idle such that exhaust continues to flow past the oxidation catalyst 106. As the exhaust flows past the oxidation catalyst 106, the exhaust absorbs heat from the oxidation catalyst 106 and transfers that heat to the catalyst 112 downstream of the oxidation catalyst 106.

In another embodiment, the operating condition is the temperature of a particulate matter filter 108. In this embodiment, when the temperature of the particulate matter filter 108 is substantially at or above the threshold value (e.g., current catalyst temperature or operational temperature of the catalyst), the engine 102 continues to run or idle such that exhaust continues to flow past the particulate matter filter 108. As the exhaust flows past the particulate matter filter 108, the exhaust absorbs heat from the particulate matter filter 108 and transfers that heat to the catalyst 112 downstream of the particulate matter filter 108.

In certain embodiments, the operating condition is a hold-warm temperature of the catalyst. The hold-warm temperature is a temperature value that may not be as high as an operational temperature, or even the present temperature of the catalyst, but is nevertheless high enough to provide temperature support to the catalyst such that the catalyst does not excessively cool. Exemplary hold-warm temperatures include a temperature sufficiently greater than ambient and/or a temperature above a specified hold-warm temperature threshold.

The processing subsystem may also include an engine management module 306 that is structured to continue to operate the internal combustion engine 102 when the operating condition is substantially at or above the threshold value. As one example, the engine management module 306 continues to operate the engine by idling the engine when the engine would otherwise be stopped under nominal control. As another example, the engine management module 306 continues to operate the engine by fueling the engine, which may further include operating the engine above an idling speed.

In another embodiment, in addition to continuing to run or idle the engine, the engine management module 306 may also heat the catalyst 112. In this embodiment, the operating condition monitoring module 302 also monitors the temperature of the catalyst 112 as well as operating conditions of the engine 102 and heater 116. When the temperature of the catalyst 112 is below operational temperature, or below another selected temperature, the engine management module 306 may actively heat the catalyst 112. The operating condition management module 304 may determine whether the engine 102 can be perform a post-injection event or load the engine 102 based on current load or torque demands on the engine 102 or fuel the engine. The operating condition management module 304 may also determine whether there is sufficient energy in the high-voltage battery 122, the DC-DC converter 124, the DC bus 126, the AC bus 128, the low-voltage battery 130, the inverter 132, or the electric machine 118 to power the heater 116.

As one example of actively heating the catalyst, the engine management module 306 heats the catalyst 112 by loading the engine, which may include performing a cylinder shut-off operation (e.g. cutting fueling from one or more cylinders) to increase the exhaust temperature from the engine 102. As another example, the engine management module 306 heats the catalyst 112 by performing a post-injection event, which may include injecting fuel late in the combustion cycle to increase exhaust temperature generated by the engine 102. The additional heat generated by performing a post-injection event or cylinder shut-off operation is transferred to the catalyst 112 as the exhaust flows through the catalyst 112. As yet another example, the engine management module 306 may also control one of the electrical components to supply power the heater 116 upstream of the catalyst 112.

If the operating condition monitoring module 302 monitors a temperature of the catalyst 112, the temperature of the catalyst 112 may be monitored at an inlet of the catalyst 112 or in a mid-bed portion of the catalyst 112. In one embodiment, the engine management module 306 may allow the engine 102 to be stopped when the temperature of the catalyst 112 is substantially at or above an operational temperature of the catalyst 112.

In another embodiment, the operating condition monitoring module 302 may monitor values provided by any of the sensors 144 shown in FIG. 1. In yet another embodiment, the operating condition monitoring module 302 monitors three sensors 144. In one embodiment, the three sensors 144 monitored by the operating condition monitoring module 302 include an oxidation catalyst inlet temperature sensor, an oxidation catalyst outlet temperature sensor, and a particulate matter filter outlet temperature sensor.

In one embodiment, the engine 102 continues to operate if a highest temperature of the three sensors 144 is substantially at or above the threshold value. In another embodiment, the engine 102 continues to operate if an average temperature of the three sensors 144 is substantially at or above the threshold value. As used herein, the average temperature refers to either one of the mean or the median, or any other averaging method understood in the art. In yet another embodiment, the engine 102 continues to operate if a lowest temperature of the three sensors is substantially at or above the threshold value. In certain embodiments, any number of two or more upstream sensors may be utilized to determine whether upstream temperature is available for the catalyst, and operations may further include ignoring or otherwise discounting outlier information from the two or more upstream sensors.

Figure 4:
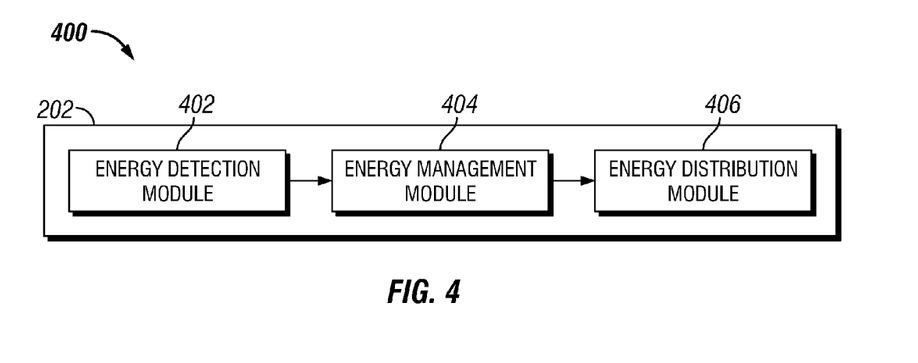
FIG. 4 is a schematic block diagram of a second exemplary processing subsystem.

FIG. 4 is a schematic block diagram of a processing subsystem 400 for managing energy in an aftertreatment system. The processing subsystem 400 includes a processing device 202 that may be part of a controller 200. The processing device 202 includes modules configured to provide multiple functionalities relating to energy management as well as providing other functionalities. As described above, the presented organization of the modules is exemplary only, and other organizations, configurations and arrangements are contemplated.

The processing subsystem 400 may include an energy detection module 402 that is structured to determine an energy level of an energy source. In one embodiment, the energy source includes any of the components 102, 104, 106, 108, 134, 136, 138, 140, 142 or sensor 144 locations upstream of the catalyst 112. If any of these components or sensor locations are at a higher temperature than the operational temperature of the catalyst 112 or the current temperature of the catalyst 112, heat is potentially available to the catalyst 112. In another embodiment, the energy detection module 402 may monitor the electrical energy in the electrical components such as the high-voltage battery 122, the DC-DC converter 124, the DC bus 126, the AC bus 128, the low-voltage battery 130, the inverter 132, or the electric machine 118. In yet another embodiment, the energy detection module 402 monitors engine operating conditions, such as load demands or torque demands, used for determining whether a post-injection event and/or a cylinder shut-off operation may be performed. A cylinder shut-off operation, as described herein, includes an operation wherein one or more cylinders of the engine are cutoff from fueling, but at least one of the cylinders continues fueling. The valves of the non-fueling cylinders may be closed or continue normal operations. The cylinder shut-off operation increases the torque of the fueling cylinders to maintain the same overall engine torque output, providing for an increased exhaust temperature as is known in the art.

The processing subsystem 400 may also include an energy management module 404 that is structured to determine whether the energy level is sufficient to transfer energy to a catalyst such as catalyst 112. In one embodiment, the energy management module 404 may determine whether the temperature of any of the components such as the oxidation catalyst 106 and/or the particulate matter filter 108 is greater than an operational temperature of the catalyst 112, greater than the current temperature of the catalyst 112, and/or greater than a hold-warm temperature of the catalyst 112. In certain further embodiments, the energy management module 404 may determine whether the temperature of the selected component is enough greater than the operational temperature of the catalyst 112 or the current temperature of the catalyst 112 such that a desired rate of heat transfer is available from the selected component to the exhaust gas and/or to the catalyst 112.

In another embodiment, the energy management module 404 may determine whether the energy level of any of the electrical components such as the high-voltage battery 122, the DC-DC converter 124, the DC bus 126, the AC bus 128, the low-voltage battery 130, the inverter 132, or the electric machine 118 are capable of charging a heater. The energy level may reference a current state-of-charge, a current available charging capacity, a current available energy flux (e.g. an electrical bus delivery capability), or other energy level description understood in the art. The energy management module 404 may also determine whether a post-injection event or a cylinder shut-off operation may be performed by analyzing load demands or torque demands on the engine 102.

The processing subsystem 400 may also include an energy distribution module 406 that is structured to transfer energy to the catalyst 112 when the energy level is sufficient. In one embodiment, if the temperature of a component such as an oxidation catalyst 106 or particulate matter filter 108 is sufficient, then the energy distribution module 406 may transfer energy to the catalyst 112 by continuing to flow exhaust through the exhaust system 104 by continuing to operate or fuel the engine 102, even when the engine 102 would be stopped under normal operations of the system. In another embodiment, if a post-injection event or a cylinder shut-off operation may be performed, the energy distribution module performs post-injections or loads the engine 102 to generate additional heat in the engine exhaust. In yet another embodiment, if the electrical energy from an energy source is sufficient, the energy distribution module 406 uses energy from the energy source, such as the high-voltage battery 122, the DC-DC converter 124, the DC bus 126, the AC bus 128, the low-voltage battery 130, the inverter 132, or the electric machine 118, to charge a heater 116 that heats the catalyst 112.

Figure 5:
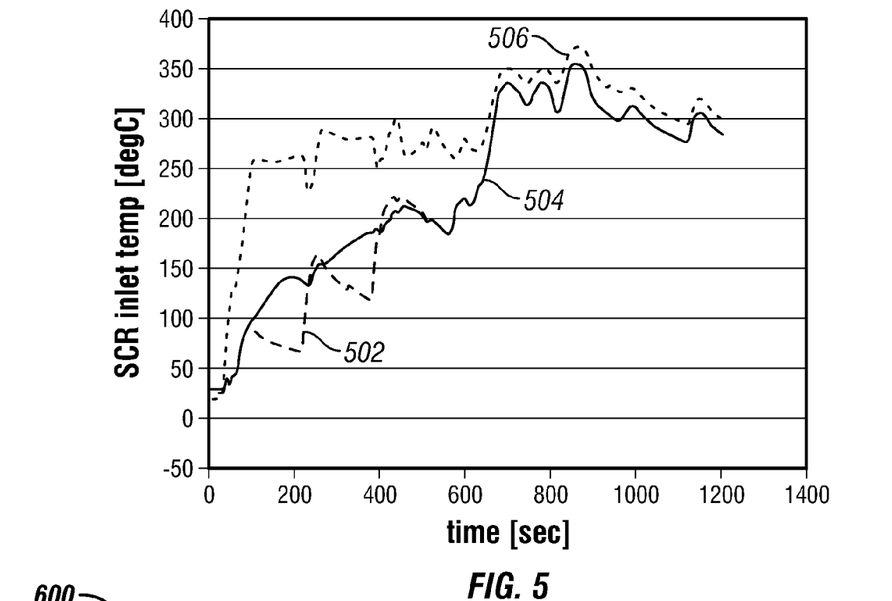
FIG. 5 is a graph of simulation data showing a catalyst temperature response.

FIG. 5 is a graph that shows simulation data 500 using some of the techniques described previously. In FIG. 5, the temperature is determined at the inlet of the catalyst. The baseline plot 502 shows catalyst temperature as it varies over time after a cold-start of the engine. The baseline plot 502 does not employ any of the techniques discussed above for heating the catalyst, i.e., the engine was allowed to stop according to the normal operations of the hybrid vehicle, and no active heating was performed. The modified start/stop plot 504 shows catalyst temperature over time when the engine continues to operate or idle even when the engine would be stopped in under a normal control scheme. The heater plot 506 shows catalyst temperature over time when a heater is used as described above to accelerate heating of the catalyst, in addition to the operations that cause the engine to continue to operate or idle.

Figure 6:
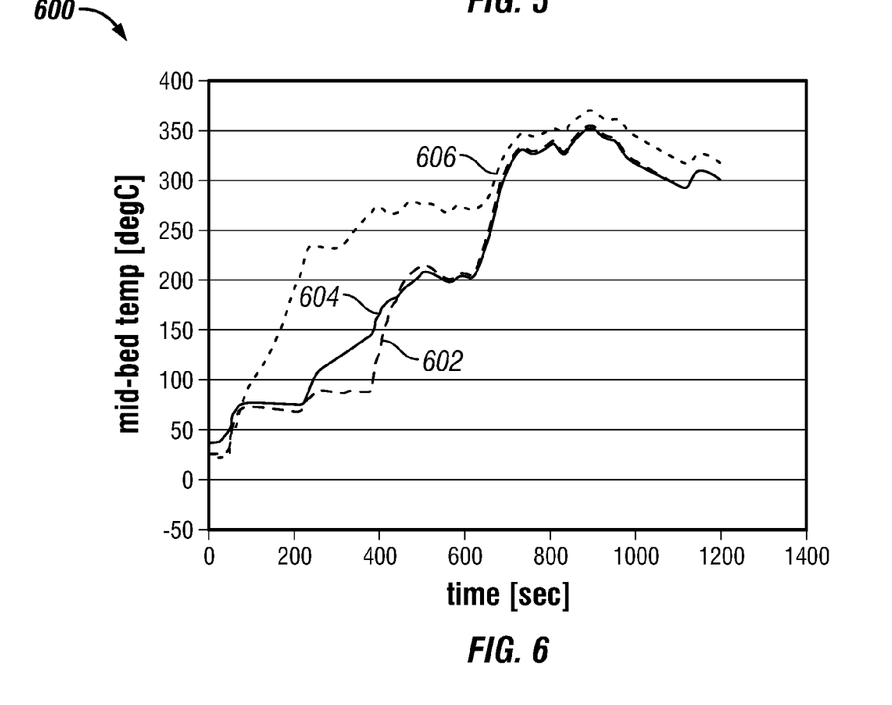
FIG. 6 is a graph of another set of simulation data showing a catalyst temperature response.

It is observed in FIG. 5 that the modified start/stop operations 504 cause the catalyst temperature to increase nearly monotonically to the operating temperature, without significant cooling or flat periods as observed in the baseline plot 502. It is also observed that the combination of the heater and the modified start/stop operations cause the catalyst temperature to monotonically increase to the operating temperature in a significantly reduced time relative to the baseline operations or the modified start/stop operations without the heater. FIG. 6 shows similar simulation data 600 as in FIG. 5, but the catalyst temperature was measured in a mid-bed portion of the catalyst rather than at the inlet of the catalyst. The data curves 602, 604, 606 are dampened from the curves illustrated in FIG. 5, due to the thermal mass of the catalyst. It is also observed in FIG. 6 that the modified start/stop operations 604 improve the temperature trajectory of the catalyst to the operational temperature, and that the modified operations with the heater 606 significantly reduce the time until the operational temperature is achieved.

As is evident from the figures and text presented above, a variety of embodiments according to the present invention are contemplated.

An exemplary set of embodiments includes a method, the method including interpreting a threshold temperature value, and monitoring an upstream temperature that is a temperature at a position in an internal combustion engine exhaust stream that is upstream of a catalyst. The method further includes, in response to the upstream temperature being at least equal to the threshold temperature value, continuing to operate the engine.

Certain further exemplary embodiments of the method are described. Exemplary embodiments include interpreting the threshold temperature value as a current temperature of the catalyst. In certain further embodiments, the method further includes allowing the engine to be stopped in response to the current temperature of the catalyst exceeding an operational temperature of the catalyst. In certain embodiments, the monitoring the upstream temperature includes monitoring a temperature of an oxidation catalyst inlet, a temperature of oxidation catalyst outlet, a temperature of a particulate matter filter inlet, a temperature of a particulate matter filter outlet, a temperature of an SCR catalyst inlet, and/or a temperature of an SCR catalyst outlet.

In certain embodiments, the method includes actively heating the catalyst. In certain further embodiments, actively heating the catalyst includes increasing an engine-out temperature and/or activating a heater positioned upstream of the catalyst. An exemplary method further includes monitoring an upstream temperature by monitoring a catalyst mid-bed temperature, with at least a portion of the catalyst being downstream of the mid-bed temperature location. An exemplary method further includes monitoring a second upstream temperature and a third upstream temperature, where the continuing to operate an internal combustion engine is further in response to an average of the upstream temperatures being at least equal to the threshold temperature value. In certain further embodiments, the method further includes monitoring a second upstream temperature and a third upstream temperature, and the continuing to operate the internal combustion engine is further in response to any one of the upstream temperatures being at least equal to the threshold value.

Another exemplary set of embodiments is an apparatus including an operating condition monitoring module that interprets a temperature value at a position upstream of a catalyst positioned in an aftertreatment system for an engine, an operating condition management module that interprets a threshold temperature value, and an engine management module that provides an engine operation command to continue engine operation in response to the temperature value being at least equal to the threshold temperature value. Certain further embodiments include the operating condition monitoring module further interpreting the temperature value in response to a plurality of temperature input values. In still further embodiments, the apparatus includes the operating condition monitoring module determining the temperature value from a process selected from the processes consisting of determining an average of the temperature input values, selecting a highest of the temperature input values, selecting a lowest of the temperature input values, and/or removing an outlier of the plurality of temperature input values from consideration.

In certain embodiments, the apparatus includes the threshold temperature value being a current temperature of the catalyst, an operational temperature of the catalyst, and/or a hold-warm temperature of the catalyst. In certain embodiments, the threshold temperature value is a temperature value between approximately 165° C. and approximately 230° C. Additionally or alternatively, the threshold temperature value includes a value of at least 200° C. An exemplary apparatus includes the position upstream of the catalyst being an oxidation catalyst inlet, an oxidation catalyst outlet, and/or a particulate matter filter outlet. In certain embodiments, the apparatus includes a means for heating the catalyst.

Another exemplary set of embodiments includes determining an energy level of an energy source operationally coupled to an aftertreatment system for an engine, determining whether the energy level is sufficient to transfer thermal energy to a catalyst disposed in the aftertreatment system, and transferring thermal energy to the catalyst by continuing to flow engine exhaust in response to determining the energy level is sufficient. Exemplary embodiments of the method include continuing to flow engine exhaust by performing at least one of a cylinder shut-off operation and/or a post-injection event in the engine. In certain embodiments, the energy source includes thermal energy associated with an upstream component of the aftertreatment system.

Yet another exemplary set of embodiments includes an apparatus having an energy detection module that determines an energy level of an energy source operationally coupled to an aftertreatment system for an engine, an energy management module that determines whether the energy level is sufficient to transfer thermal energy to a catalyst disposed in the aftertreatment system, and an energy distribution module that transfers thermal energy to a catalyst by continuing to flow engine exhaust in response to determining the energy level is sufficient. The energy source may include a high-voltage battery, a DC-DC converter, a DC bus, an AC bus, a low-voltage battery, an inverter, and/or an electric machine. In certain further embodiments, the energy management module further determines whether the energy level is sufficient by determining whether the energy level of the energy source is sufficient to charge a heater.

Still another exemplary set of embodiments is a system including an internal combustion engine producing exhaust gases as a byproduct of operation and an aftertreatment system that treats the exhaust gases. The system further includes a controller having modules structured to functionally execute operations to enhance aftertreatment capability of the system. The controller includes an operating condition monitoring module that interprets a temperature value at a position upstream of a catalyst positioned in an aftertreatment system for an engine, an operating condition management module that interprets a threshold temperature value, and an engine management module that provides an engine operation command to continue engine operation in response to the temperature value being at least equal to the threshold temperature value.

In certain further embodiments, the system includes an electric machine coupled to the engine that propels a vehicle when the engine operation is discontinued. In certain embodiments, the catalyst is part of a selective catalytic reduction system. An exemplary system includes an oxidation catalyst located upstream of the catalyst, and/or a particulate matter filter located upstream of the catalyst. In certain embodiments, the temperature value at a position upstream of a catalyst is provided by an intake air temperature sensor, an intake manifold temperature sensor, a turbine inlet temperature sensor, a turbine outlet temperature sensor, a compressor outlet temperature sensor, an engine coolant temperature sensor, an engine oil temperature sensor, an exhaust manifold temperature sensor, an exhaust gas recirculation temperature sensor, an inlet oxidation catalyst temperature sensor, an outlet oxidation catalyst temperature sensor, and/or an outlet particulate matter filter temperature sensor.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an internal combustion engine to produce an exhaust stream into an exhaust system including at least one catalyst;
    interpreting a threshold temperature value of the catalyst;
    monitoring a plurality of upstream temperatures at a position in the exhaust stream that is upstream of the catalyst;
    in response to one or more of an average of the plurality of upstream temperatures and at least one of the plurality of upstream temperatures being at least equal to the threshold temperature value, preventing a nominal control stop of the engine while continuing to operate the engine to absorb heat into the exhaust stream upstream of the catalyst and pass the exhaust stream through the catalyst to increase a current temperature of the catalyst; and
    stopping the engine in response to a current temperature of the catalyst exceeding an operational temperature of the catalyst, wherein the threshold temperature value is the current temperature of the catalyst.

2. The method of claim 1, wherein the monitoring the plurality of upstream temperatures comprises monitoring at least one temperature selected from the temperatures consisting of: a temperature of an oxidation catalyst inlet, a temperature of oxidation catalyst outlet, a temperature of a particulate matter filter inlet, a temperature of a particulate matter filter outlet, a temperature of an SCR catalyst inlet, and a temperature of an SCR catalyst outlet.

3. The method of claim 1, further comprising actively heating the catalyst.

4. The method of claim 3, wherein actively heating the catalyst comprises one of increasing an engine-out temperature and activating a heater positioned upstream of the catalyst.

5. The method of claim 1, further comprising monitoring a mid-bed temperature and stopping operation of the engine in response to the mid-bed temperature exceeding the operational temperature of the catalyst.

6. The method of claim 1, wherein the plurality of upstream temperatures includes a second upstream temperature and a third upstream temperature.

7. A system, comprising:
    an internal combustion engine capable of producing exhaust gases as a byproduct of operation;

an aftertreatment system structured to treat the exhaust gases, the aftertreatment system including at least one catalyst, wherein the aftertreatment system further comprises an oxidation catalyst located upstream of the at least one catalyst and a particulate matter filter located upstream of the at least one catalyst; and a controller structured to interpret a plurality of temperature values at a position upstream of the catalyst and a threshold temperature value of the catalyst, wherein the controller is further structured to provide an engine operation command to prevent a nominal control stoppage of the engine and continue engine operation to absorb heat into the exhaust gases to increase a current temperature of the catalyst in response to the one or more of an average of the plurality of upstream temperature values and at least one of the plurality of upstream temperature values at the position upstream of the catalyst being at least equal to the threshold temperature value, and wherein the controller is further structured to stop the engine in response to the current temperature of the catalyst exceeding an operational temperature of the catalyst, wherein the threshold temperature value is the current temperature of the catalyst.

8. The system of claim 7, further comprising an electric machine coupled to the engine and structured to propel a vehicle when the engine operation is discontinued.

9. The system of claim 7, wherein the catalyst is part of a selective catalytic reduction system.

10. The system of claim 7, further comprising wherein the plurality of upstream temperature values are provided by at least one sensor selected from the group of sensors consisting of: an intake air temperature sensor, an intake manifold temperature sensor, a turbine inlet temperature sensor, a turbine outlet temperature sensor, a compressor outlet temperature, an engine coolant temperature sensor, an engine oil temperature sensor, an exhaust manifold temperature sensor, an exhaust gas recirculation temperature sensor, an inlet oxidation catalyst temperature sensor, an outlet oxidation catalyst temperature sensor, and an outlet particulate matter filter temperature sensor.

11. The system of claim 7, wherein the controller is further structured to interpret the plurality of temperature values from a process selected from the processes consisting of: selecting a highest of the plurality of temperature values, selecting a lowest of the plurality of temperature values, and removing an outlier of the plurality of temperature values from consideration.

12. The system of claim 7, wherein the operational temperature comprises a temperature value between approximately 165° C. and approximately 230° C.

13. The system of claim 7, wherein the operational temperature is at least 200° C.

14. The system of claim 7, wherein the position upstream of the catalyst comprises at least one position selected from the positions consisting of an oxidation catalyst inlet, an oxidation catalyst outlet, and a particulate matter filter outlet.

15. The system of claim 7, further comprising means for heating the catalyst.

16. The system of claim 7, wherein the plurality of temperature values are provided by at least one sensor selected from the group of sensors consisting of: an intake air temperature sensor, an intake manifold temperature sensor, a turbine inlet temperature sensor, a turbine outlet temperature sensor, a compressor outlet temperature, an engine coolant temperature sensor, an engine oil temperature sensor, an exhaust manifold temperature sensor, an exhaust gas recirculation temperature sensor, and an outlet particulate matter filter temperature sensor.

17. The system of claim 7, wherein the plurality of temperature values include a first upstream temperature, a second upstream temperature and a third upstream temperature.

* * * * *